United States Patent Office 3,632,648
Patented Jan. 4, 1972

3,632,648
CONTINUOUS PRODUCTION OF DIAMINO-DICYCLO-HEXYLALKANES
Hubert Corr, Ott-Alfred Grosskinsky, Norbert Loesch, and Kurt Pilch, Ludwigshafen (Rhine), Germany, assignors to Badische Anilin- & Soda-Fabrik Aktiengesellschaft, Ludwigshafen (Rhine), Germany
No Drawing. Filed June 4, 1968, Ser. No. 734,237
Claims priority, application Germany, June 10, 1967,
P 16 18 174.1
Int. Cl. C07c 85/14
U.S. Cl. 260—563 D   11 Claims

ABSTRACT OF THE DISCLOSURE

A process for the continuous production of diaminodicyclohexylalkanes by contacting diaminodiphenylalkanes with hydrogen at elevated temperature and superatmospheric pressure in the presence of hydrogenation catalysts containing cobalt, wherein the improvement consists in carrying out the reaction at a temperature of more than 180° C. and a pressure of more than 50 atmospheres in the presence of a hydrogenation catalyst containing cobalt whose copper content is less than 0.5% by weight with reference to cobalt and maintaining a water content of less than 0.4% by weight in the reaction mixture. Diaminodicyclohexylalkanes are suitable as hardeners for epoxy resins and for the production of polyamides.

---

This invention relates to an improved process for the continuous production of diaminodicyclohexylalkanes by hydrogenation of diaminodiphenylalkanes.

It is known from U.S. patent specification No. 2,606,927 that aminodiphenylalkanes can be hydrogenated in the presence of ethers, such as dioxane, and cobalt or nickel catalysts. The yields obtained by this method are however unsatisfactory. According to another method (U.S. patent specification No. 2,606,924) good yields are achieved in the hydrogenation of 4,4'-diaminodiphenylmethane with ruthenium catalysts in the presence of dioxane. Ruthenium catalysts are not very suitable for industrial purposes however because they are very expensive. It is also known from British patent specification No. 718,508 that the hydrogenation of 4,4'-diaminodiphenylmethane with cobalt or nickel catalysts in the presence of hydrophobic solvents and alkaline earth metal oxides achieves good yields. This method is not very suitable for continuous operation because the catalyst composition agglomerates after a short time and thus loses its activity. Deamination products, which are difficult to separate, are formed in the hydrogenation in all prior art methods, particularly in a melt.

The object of this invention is to provide an improved process in which diaminodicyclohexylalkanes are obtained in high yields. Another object of the invention is to provide an improved process in which the reaction can be carried out continuously while maintaining the activity of the catalysts. A further object of the invention is to provide a process in which almost no deamination products are formed.

In accordance with this invention these and other objects and advantages are achieved in an improved process for the continuous production of diaminodicyclohexylalkanes by contacting diaminodiphenylalkanes with hydrogen at elevated temperature and at superatmospheric pressure in the presence of hydrogenation catalyst containing cobalt, wherein the improvement comprises carrying out the reaction at temperatures of more than 180° C. and pressures of more than 50 atmospheres in the presence of hydrogenation catalysts containing cobalt whose copper content is less than 0.5% by weight with reference to cobalt, and maintaining in the reaction mixture a water content of less than 0.4% by weight.

Preferred diaminodiphenylalkanes have the general formula:

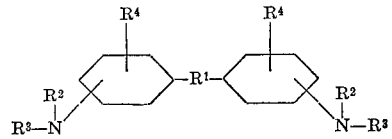

in which $R^1$ denotes an alkylene or alkylidene radical having one to four, particularly one to three, carbon atoms, $R^2$ denotes a hydrogen atom or an alkyl radical having one to four carbon atoms, $R^3$ denotes a hydrogen atom or an alkyl radical having one to four carbon atoms and $R^4$ denotes a hydrogen atom or an alkyl radical having one to four carbon atoms. Starting materials are particularly preferred in which $R^2$ and $R^3$ denote hydrogen atoms. The following are examples of suitable compounds for hydrogenation:

4,4'-diaminodiphenylmethane,
4,4'-diamino-2,2'-dibutyldiphenylmethane,
N,N,N',N'-tetramethyl-4,4'-diaminodiphenylmethane,
N,N'-dibutyl-4,4'-diaminodiphenylmethane,
4,4'-diaminodiphenylpropane-(1,3),
4,4'-diaminodiphenylbutane-(1,4),
4,4'-diaminodiphenylpropane-(2,2),
2,2'-diaminodiphenylmethane,
2,4'-diaminodiphenylmethane, and
2,2'-diamino-4,4'-dimethyldiphenylmethane.

The process has particular importance for the hydrogenation of 4,4'-diaminodiphenylmethane and 4,4'-diaminodiphenylpropane-(2,2).

Hydrogenation is carried out at temperatures of more than 180° C. It is advantageous to use temperatures of from 190° to 280° C. Particularly good results are obtained when temperatures of 200° to 250° C. are used. Hydrogenation proceeds at pressures of more than 50 atmospheres. In general, pressures of from 50 to 500, particularly from 100 to 300, atmospheres are used.

Preferred catalysts contain 80 to 100%, particularly 90 to 100%, by weight of cobalt. The catalysts may also contain activators, such as manganese or chromium, for example up to 20% by weight thereof. The catalysts may be used as unsupported catalysts or they may be used on carriers, such as aluminas, aluminum oxide or pumice. Supported catalysts advantageously contain 10 to 50% by weight of the active catalyst composition with reference to the sum of catalyst composition and carrier. It is advantageous for the catalysts to contain (in addition to the said metals) for example up to 20% by weight of alkali metal salts which have an alkaline reaction in aqueous solution, for example sodium carbonate.

It is an essential feature of the invention that the catalyst should contain less than 0.5% by weight of copper with reference to the content of cobalt. It is important to bear this in mind because cobalt often contains copper.

Another essential feature of the invention is that the hydrogenation should be carried out while substantially excluding water so that the reaction mixture has a water content of less than 0.4% by weight during hydrogenation. Particularly good results are obtained when the water content is from 0.001 to 0.2% by weight. The said water content is achieved most simply by using starting materials having an appropriately low content of water. Removal of water from the starting materials may be achieved for example by passing inert gas, such as nitrogen or hydrogen, through them. It is also possible to use substances which adsorb water or which react with water to form compounds, such as calcium oxide. It has proved to be particularly advantageous for the water content in the hydrogen used to be not more than 0.1 mole percent. A low water content in the hydrogen used may be achieved for example by recycling the hydrogen and condensing out the water contained therein by cooling and then passing it over substances, such as silica gel, which will adsorb water.

It is possible to carry out the hydrogenation in the presence of solvents which are inert under the reaction conditions. The use of solvents is, however, not absolutely necessary. Examples of suitable solvents are hydrocarbons, such as toluene or cyclohexane, cyclic ethers, such as tetrahydrofuran or dioxane, and amines, such as cyclohexylamine or alkylated cyclohexylamines.

The process according to the invention may be carried out for example by passing hydrogen and a diaminodiphenylalkane upwardly or downwardly over one of the said static hydrogenation catalysts in a vertical high-pressure tube at the specified pressure tube at the specified pressure and temperature, in the presence or absence of an inert solvent, care being taken to ensure that the specified water content in the reaction mixture is not exceeded. It is advantageous to recycle the hydrogen used and to condense out water by cooling before the hydrogen is reused. The diaminodicyclohexylalkane is isolated from the reaction product by fractional distillation. The recovered solvent and partly hydrogenated products are returned to the reaction.

The diaminodicyclohexylalkanes prepared by the process according to the invention are suitable as starting materials for high polymers.

The invention is illustrated by the following examples. The parts specified in the following examples are parts by weight and they bear the same relation to parts by volume as the kilogram to the liter.

EXAMPLE 1

A high-pressure tube is charged with a catalyst which contains 40% by weight of cobalt oxide and 17% by weight of sodium carbonate on pumice. The copper content is 0.2% by weight with reference to cobalt. The catalyst is reduced for forty-eight hours with hydrogen at 300° C. and 50 atmospheres. The hydrogen is recycled and the water formed during the reaction is condensed out by cooling the hydrogen to 70° C. Then, at a hydrogen pressure of 230 atmospheres and a temperature of 227° C., 18 parts per hour of a mixture of diaminoditolylmethane is passed over the catalyst. The starting material is dried over calcium oxide. It has a water content of 0.07% by weight. Hydrogen is recycled in an amount of $1.8 \times 10^6$ parts, cooled to 20° C. and then dried over silica gel. The water content of the hydrogen supplied is 0.01 mole percent. The water content of the liquid reaction mixture is 0.1% by weight. After operation for one week, the amount supplied is increased to 33 parts per hour. The reaction mixture obtained is fractionally distilled. At an hourly feed rate of 33 parts, 28 parts per hour (82% of the theory) of an isomer mixture of diaminodimethyldicyclohexylmethanes is obtained having a boiling point of 200° to 212° C. at 20 mm. Hg.

EXAMPLE 2

The procedure described in Example 1 is followed and a nondehydrated feed having 0.5% by weight of water is used. Moreover the hydrogen is cooled to only 70° C. without being subsequently passed over silica gel so that it has a water content of 17 mole percent. Diaminodimethyldicyclohexylmethanes are obtained in a yield of 63% of the theory. (This is a comparative example.)

EXAMPLE 3

The procedure described in Example 1 is followed with the difference that molten diaminoditolylmethanes which have been dehydrated down to 0.02% by weight of water by treatment for two hours with nitrogen are used as the feed. The recycled hydrogen ($2.7 \times 16^6$ parts) is dehydrated by cooling to 20° C. followed by treatment with silica gel. The yield of diaminodimethyldicyclohexylmethane is 84% of the theory.

EXAMPLE 4

The procedure of Example 3 is followed but a catalyst is used which contains 1.4% by weight of copper with reference to cobalt. The yield falls within two weeks to 54% of the theory. (This is a comparative example.)

EXAMPLE 5

The procedure described in Example 3 is followed and a catalyst is used which contains 0.02% by weight of copper with reference to cobalt. Diaminodimethyldicyclohexylmethane is obtained in a yield of 89% of the theory. The yield falls after four months to 85% of the theory.

We claim:

1. A process for the production of diaminodicyclohexylalkanes by contacting diaminodiphenylalkanes having the formula:

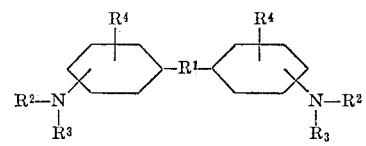

in which $R^1$ denotes an alkylene or alkylidene radical having one to four carbon atoms, $R^2$ denotes a hydrogen atom or an alkyl radical having one to four carbon atoms, $R^3$ denotes a hydrogen atom or an alkyl radical having one to four carbon atoms, and $R^4$ denotes a hydrogen atom or an alkyl radical having one to four carbon atoms, with hydrogen at elevated temperature and at superatmospheric pressure in the presence of a hydrogenation catalyst containing cobalt, wherein the improvement comprises carrying out the reaction at a temperature of 180° C. to 280° C. and at a pressure of 50 to 500 atmospheres in the presence of a hydrogenation catalyst consisting essentially of, as the active catalytic components, 80–100% by weight of cobalt, 0–0.5% by weight of copper, 0–20% by weight of manganese or chromium, and 0–20% by weight of sodium carbonate and maintaining a water content in the reaction mixture of less than 0.4% by weight to improve the yield of said diaminodicyclohexylalkanes.

2. A process as claimed in claim 1 in which the diaminodiphenyl alkane used as starting material has the formula:

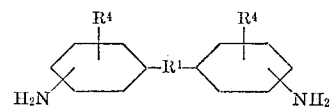

in which $R^1$ denotes an alkylene or alkylidene radical having one to four carbon atoms and $R^4$ denotes a hydrogen atom or an alkyl radical having one to four carbon atoms.

3. A process as claimed in claim 1 in which 4,4'-diaminodiphenylmethane is used as starting material.

4. A process as claimed in claim 1 in which 4,4'-diaminodiphenylpropane-(2,2) is used as starting material.

5. A process as claimed in claim 1 carried out at a temperature of from 200° to 255° C.

6. A process as claimed in claim 1 carried out at a pressure of from 100 to 300 atmospheres.

7. A process as claimed in claim 1 in which a water content of from 0.001 to 0.2% by weight is maintained in the reaction mixture.

8. A process a claimed in claim 1 carried out in the presence of a solvent which is inert under reaction conditions.

9. A process as claimed in claim 1 wherein the catalyst used has a cobalt content of from 90 to 100% by weight.

10. A process as claimed in claim 1 wherein said diaminodiphenylalkane is dried to remove substantially all of the water therein.

11. A process as claimed in claim 10 wherein said hydrogen is dried to a water content of not more than .01 mol percent.

References Cited

UNITED STATES PATENTS

| | | | |
|---|---|---|---|
| 2,166,183 | 7/1939 | Signaigo | 260—583 |
| 3,351,650 | 11/1967 | Cross et al. | 260—563 X |

OTHER REFERENCES

Barkdoll et al.: J. American Chemical Society, vol. 75, pp. 1156–1159 (1953).

CHARLES B. PARKER, Primary Examiner

D. R. PHILLIPS, Assistant Examiner